3,317,497
SUBSTITUTED PENTACHLOROCYCLOPENTADIENES AND PROCESS FOR THEIR PRODUCTION

Earl T. McBee, Lafayette, Ind., assignor to Purdue Research Foundation, West Lafayette, Ind., a corporation of Indiana
No Drawing. Filed Apr. 11, 1961, Ser. No. 102,111
6 Claims. (Cl. 260—91.5)

This invetnion relates to a process for making compositions of matter classified in the art of chemistry as cyclopentadiene compounds and to the novel compositions produced thereby.

The invention sought to be patented, in its process aspect, resides in the concept of preparing alkyl substituted pentachlorocyclopentadiene compounds by the reaction of hexachlorocyclopentadiene with lithium aluminum hydride followed by the reaction of the resultant anion with an alkyl halide.

The invention sought to be patented, in its composition aspect, resides in the concept of the novel alkyl substituted pentachlorocyclopentadiene compounds produced by the above process. The inventive concept also embraces the adducts formed by the Diels-Alder addition of these compounds with dienophiles.

The tangible embodiments of this invention are high boiling oils or crystalline solids. The alkyl substituted pentachlorocyclopentadienes are useful as chemical intermediates and fungicides, especially in the control of early blight of tomatoes and the damping off of pea seedlings in pythium infested soils when applied at the rate of 50 to 400 parts per million. The adducts are also useful as fungicides and, when the dienophile contains groups capable of esterification, for the preparation of fire-retardant resins.

The manner and process of making and using this invention is illustrated by the following general description and examples, which set forth the best mode contemplated by me of carrying out the invention so as to enable any person skilled in the art of chemistry to make and use the same:

The process aspect of the present invention may be illustrated by Equation I and II:

(I)  $C_5Cl_6 + 2LiAlH_4 \rightarrow C_5Cl_5^\ominus LiAlH_3^\oplus$ (II)  $C_5Cl_5^\ominus LiAlH_3^\oplus + RX \rightarrow C_5Cl_5R$ wherein RX represents an alkyl halide. In Equation I, more than one mole of lithium aluminum hydride per mole of hexachlorocyclopentadiene is required for formation of the pentachlorocyclopentadienyl anion. Once the anion is formed, in no matter how slight a concentration, it is available for reaction with the alkyl halide. Thus all that is required here for the reactions represented by Equations I and II to occur is that the lithium aluminum hydride be present in molar excess with respect to the amount of hexachlorocyclopentadiene initially present. Theoretical yields can only be obtained when the hydride and alkyl halide are present in at least stoichiometric amounts. Optimum yields are obtained when quantities close to that called for by Equations I and II are used. It is emphasized that the process is operative when lesser or greater amounts are used. However, the use of any substantial excess of lithium aluminum hydride or alkyl halide would not materially improve the ultimate yield of product that can be obtained by the process. Equations I and II are for the purpose of illustration only since the pentachlorocyclopentadienyl anion was never isolated, alone or as part of a salt, or otherwise separated from the reaction mixture.

As used herein the term "alkyl" is to be construed broadly and includes unsubstituted alkyl radicals and substituted alkyl radicals wherein the carbon atom bearing the reactant halogen atom remains alkyl in nature. By the latter is meant that the carbon atom bearing the reactant halogen atom is attached only to hydrogen atoms or other carbon atoms. Thus the alkyl halide may bear aromatic, unsaturated, and other substituents. The presence of competing functional groups will not make the present process inoperative since the alkyl halide will react with the pentachlorocyclopentadienyl anion as before, save that more of the reactants may be required to satisfy the demands of all of the reacting functional groups. It cannot be emphasized too strongly that even under these unusual conditions, the ultimate product would still be an alkyl substituted pentachlorocyclopentadiene compound falling within the scope of this invention.

It is apparent that anyone skilled in the art of chemistry can readily determine whether a given compound is an alkyl halide suitable for use in the practice of the present invention. However, lower alkyl halides containing 1 to 6 carbon atoms, benzyl halides, substituted benzyl halides, allylic halides, and substituted allylic halides form a preferred group and are particularly suited for the practice of this invention.

Allylic compounds of the general formula $$C_5Cl_5-CH_2-CH=CHR'$$

wherein R' represents any organic radical have special properties, as will be described below, and form a special sub-group of compositions that have been made by the process of the present invention. The most common of these compositions are those where R' is hydrogen, lower-alkyl, or a phenyl radical. When R' is lower-alkyl it may also be attached to the alpha carbon atom (the carbon atom of the alkyl substituent that is attached to the pentachlorocyclopentadiene ring to form a carbocylic ring, i.e., cyclopentene, cyclohexene, and the like). Due to the presence of the allylic unsaturation, these compounds form homopolymers on heating. All of the chlorine in these novel polymers is stable since dehydrochlorination is sterically impossible according to Bredt's rule. An example of such a polymeric structure is illustrated as follows:

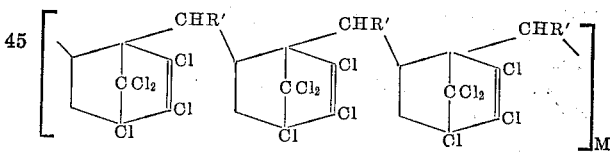

These polymers are non-flammable and useful for coatings, films, and molded articles. The residual unsaturation at the terminus of the polymer chain, or that present in the monomer, could be used for curing or for copolymerization. For example, subsequent curing by the addition of peroxide catalysts or copolymerization with vinyl monomers such as styrene.

The process of this invention represented by Equations I and II is normally effected in the presence of an unreactive organic solvent. By unreactive is meant that the solvent is unaffected by and stable to the reactants, products and reaction conditions of the process. Suitable unreactive solvents will be readily recognized by those skilled in the art at including but not limited to ethers such as diethyl ether and tetrahydrofuran, aromatic hydrocarbons such as benzene and toluene, aliphatic hydrocarbons such as hexane and various petroleum ether fractions, and chlorinated hydrocarbons such as chloroform and carbon tetrachloride. The ethers form a preferred class of solvents for use in the process of the present invention.

The precise conditions under which the reactants are contacted are not critical but temperatures below zero degrees centigrade and in the neighborhood of −20 to −30 degrees centigrade are to be preferred. In a typical procedure, a hexachlorocyclopentadiene solution is chilled in a Dry Ice-solvent bath to about −30 degrees centigrade. Provisions are made for stirring and adding the reactants in the absence of air and moisture preferably by the use of an inert atmosphere such as that of nitrogen. A solution of lithium aluminum hydride is added dropwise to the chilled hexachlorocyclopentadiene solution. Next a solution of the appropriate alkyl halide is added dropwise to the chilled reaction mixture. After standing for a period of time at −20 to −30 degrees centigrade, the reaction mixture is decomposed with ice and hydrochloric acid. The two layers are separated, the water layer repeatedly extracted with ether, and the ether extracts combined, washed with water, and dried over calcium sulfate. Evaporation of the solvent leaves the product usually as an oil which can be purified by vacuum distillation. When solids, the products can be purified by recrystallization from organic solvents such as the alcohols in the usual manner.

The alkyl substituted pentachlorocyclopentadiene compounds produced by the process of this invention behave as typical dienes in a Diels-Alder reaction, and adducts will be obtained with the dienophiles customarily used in the diene reaction. Typical dienophiles include maleic anhydride, quinone, and other unsaturated compounds where the double bond is activated by a negative linkage such as a carbonyl or cyano group. The condensation is most conveniently effected in the presence of an unreactive organic solvent. By unreactive is meant that the solvent is unaffected by and stable to the reactants, products and reaction conditions of the diene synthesis. Suitable solvents would be readily recognized by those skilled in the art as including but not limited to chlorinated hydrocarbons such as chloroform and carbon tetrachloride and aromatic hydrocarbons such as benzene and toluene. Superior yields are obtained when the condensation is effected at the reflux temperature of the solvent employed and when the reactants are allowed to remain in contact with each other for a long period of time. The adduct is recovered from the reaction mixture and is purified by conventional techniques, usually fractional crystallization. The substituted pentachlorocyclopentadiene compound dienophile adducts of this invention are colorless crystalline compounds melting above 100 degrees centigrade. They are complex polycyclic compounds, the structure of which depends on the nature of the dienophile employed. These adducts are useful as chemical intermediates and as insecticides.

The foregoing discussion is offered to illustrate methods suitable for the practice of my invention and not to limit its scope. The following examples further illustrate the present invention (all temperatures are given in degrees centigrade):

*General procedure for the preparation of alkyl pentachlorocyclopentadienes.*—A three-necked, round-bottom flask fitted with a dropping funnel, drying tube, and mercury-sealed stirrer was flamed out under a nitrogen atmosphere and immersed in a trichloroethylene-carbon dioxide bath cooled to −30 degrees. Into the flask was placed 27.3 grams (0.1 mole) of hexachlorocyclopentadiene dissolved in 60 milliliters of anhydrous ether. To this solution there was added over the period of about two hours, 8.0 grams (0.11 mole) of lithium aluminum hydride dissolved in 500 milliliters of ether. Next 0.1 mole of the alkyl halide in ether was added dropwise to the reaction mixture. The reaction was allowed to proceed from 9 to 25 hours at −20 to −30 degrees, whereupon, the reaction mixture was poured onto a mixture of crushed ice and concentrated hydrochloric acid. Upon separation of the two layers, the water layer was repeatedly extracted with ether, and the ether extracts combined, washed with water and dried over calcium sulfate. The ether was removed by evaporation and the residue cooled. If crystallization could not be induced, the product was purified by vacuum distillation. The crystalline products were purified by recrystallization from methanol or ethanol.

*Example 1.—n-Butylpentachlorocyclopentadiene*

Using the general procedure, 137 grams (1.0 mole) of n-butyl bromide was added to the reaction mixture. An 8.4 gram or 28.6 percent yield of n-butylpentachlorocyclopentadiene boiling 77 to 82 degrees at 0.5 millimeter of mercury pressure, $n_D^{20}=1.5336$, was obtained.

Calculated for $C_9H_9Cl_5$: C, 36.75; H, 3.06; Cl, 60.22. Found: C, 36.52; H, 2.93; Cl, 60.27.

*Example 2.—Cinnamylpentachlorocyclopentadiene*

Using the general procedure, 15.25 grams (0.1 mole) of cinnamyl chloride was added to the reaction mixture. A 9.98 gram or 28.2 percent yield of product was obtained boiling 122 to 171 degrees at 0.8 to 1.0 millimeter of mercury pressure. On cooling, crystals were formed which were recrystallized three times from ethanol to yield pure cinnamylpentachlorocyclopentadiene melting at 52 to 53 degrees.

Calculated for $C_{14}H_9Cl_5$: C, 47.50; H, 2.54; Cl, 50.0. Found: C, 47.34; H, 2.56; Cl, 49.71.

*Example 3.—3-pentachlorocyclopentadienecyclohexene*

Using the general procedure, 16.1 grams (0.1 mole) of 3-bromocyclohexene was added to the reaction mixture. A 17 gram or 53.5 percent yield of 3-pentachlorocyclopentadienecyclohexene boiling 119 to 124 degrees at 0.7 milimeter of mercury pressure, $n_D^{25}=1.5688$, was obtained.

Calculated for $C_{11}H_9Cl_5$: C, 41.50; H, 2.83; Cl, 55.70. Found: C, 41.77; H, 2.68; Cl, 55.51.

*Example 4.—Allylpentachlorocyclopentadiene*

Using the general procedure, 0.1 mole of allyl bromide dissolved in 10 milliliters of ether was added dropwise to the reaction mixture. The reaction was allowed to proceed for 9 hours at −20 to −30 degrees, and the reaction mixture decomposed by pouring over a mixture of crushed ice and concentrated hydrochloric acid. The water layer was repeatedly extracted with ether, and the ether extracts were combined, washed with water and dried over calcium sulfate. The ether was removed by evaporation and the residue vacuum distilled. Allylpentachlorocyclopentadiene boiled at 75 to 78 degrees at 0.5 millimeter of mercury pressure. The yield of product, $n_D^{21}=1.5460$, was 20.8 grams or 75 percent.

Calculated for $C_8H_5Cl_5$: C, 34.55; H, 1.80; Cl, 63.7. Found: C, 34.84; H, 2.01; Cl, 63.52.

*Example 5.—Allylpentachlorocyclopentadiene polymer*

Allylpentachlorocyclopentadiene, the product of Example 4, was heated above 150 degrees until the characteristic conjugated double bond spectrum of the diene ring disappeared. The polymer obtained was soluble in chlorinated hydrocarbons and was non-flammable.

*Example 6.—Benzylpentachlorocyclopentadiene*

Using the general procedure, 12.65 grams (0.1 mole) of benzyl chloride dissolved in 10 milliliters of ether was added dropwise to the chilled reaction mixture. The reaction was allowed to proceed for 12 hours at −20 to −30 degrees and the reaction mixture decomposed by pouring onto a mixture of crushed ice and concentrated hydrochloric acid. The water layer was repeatedly extracted with ether, and the ether extracts were combined, washed with water and dried over calcium sulfate. After removal of the solvent by evaporation, the residue was vacuum distilled. The fraction boiling at 132 to 135 degrees at 0.3 millimeter of mercury pressure was collected, $n_D^{20}=1.5828$; crystallization ensued on cooling to yield 16.4 grams or 50 percent of benzylpentachlorocyclopentadiene melting at 56.5 to 57.5 degrees.

Calculated for $C_{12}H_7Cl_5$: C, 43.75; H, 2.12; Cl, 54.10. Found: C, 44.09; H, 2.00; Cl, 53.91.

On repeating the reaction, seed crystals of benzylpentachlorocyclopentadiene induced crystallization of the concentrated ether extracts rendering distillation unnecessary.

*Example 7.—Benzylpentachlorocyclopentadiene-maleic anhydride adduct*

A solution of 6.6 grams (0.02 mole) of benzylpentachlorocyclopentadiene and 2.0 grams (0.02 mole) of maleic anhydride in 100 milliliters of dry toluene was refluxed for 48 hours. The residue obtained after evaporation of the solvent was dissolved in a hot heptanebenzene mixture and decolorized with charcoal. On cooling a total of 4.9 grams or a 57 percent yield of the adduct melting at 176 to 177 degrees was obtained.

A small quantity of the adduct was esterified by heating with excess methanol. After recrystallization, the methyl ester melted at 136.5 to 138 degrees.

Calculated for $C_{16}H_{15}Cl_5O_4$: C, 45.80; H, 3.18; Cl, 37.50. Found: C, 45.58; H, 3.37; Cl, 37.46.

*Example 8.—Benzylpentachlorocyclopentadiene-quinone adduct*

A solution of 6.56 grams (0.02 mole) of benzylpentachlorocyclopentadiene and 2.16 grams (0.02 mole) of quinone in 40 milliliters of xylene was refluxed for 16 hours. The residue obtained after evaporation of the solvent was recrystallized twice from boiling ethanol. A 3.8 gram or 43.6 percent yield of the yellow adduct melting at 132 to 134 degrees was obtained.

Calculated for $C_{18}H_{11}Cl_5O_2$: C, 49.55; H, 2.52; Cl, 40.60. Found: C, 49.71; H, 2.70; Cl, 40.62.

Isomerization of the quinone adduct to the hydroquinone form was accomplished by refluxing a solution containing two grams of the above adduct, one milliliter of pyridine, and five milliliters of benzene for 16 hours. The solution was concentrated by evaporation and the residue taken up in ether. After treatment with charcoal, a 94 percent yield of crystals melting at 172 to 173 degrees was obtained in concentrating the ether solution. The infrared spectrum of these compounds showed a loss of carbonyl absorption and a gain of hydroxyl absorption as well as bands characteristic of higher substituted benzenes.

Calculated for $C_{18}H_{11}Cl_5O_2$: C, 49.55; H, 2.52; Cl, 40.60. Found: C, 49.27; H, 2.69; Cl, 40.60.

*Example 9.—Methylbenzylpentachlorocyclopentadiene*

Using the general procedure, 14.1 grams (0.1 mole) of p-methylbenzyl chloride was added to the reaction mixture. A 14.6 gram or 42.7 percent yield of p-methylbenzylpentachlorocyclopentadiene, melting at 70 to 71 degrees, was obtained.

Calculated for $C_{13}H_9Cl_5$: C, 45.60; H, 2.63; Cl, 51.77. Found: C, 45.46; H, 2.36; Cl, 51.50.

*Example 10.—Bromobenzylpentachlorocyclopentadiene*

Using the general procedure, 25 grams (0.1 mole) of p-bromobenzyl bromide was added to the reaction mixture. The fraction which boiled between 122 to 140 degrees at 0.3 to 0.6 millimeter of mercury pressure solidified on cooling. Recrystallization from ethanol gave 8.76 grams or a 20.6 percent yield of p-bromobenzylpentachlorocyclopentadiene hydrate, melting at 75 to 76 degrees.

Calculated for $C_{12}H_6Cl_5Br \cdot H_2O$: C, 33.90; H, 1.88; Cl, 41.60. Found: C, 33.84; H, 1.90; Cl, 41.72.

Other variations of our invention will be apparent to those skilled in the art and our invention is not to be limited to the above-offered illustrative examples. Subject matter which the applicant regards as his invention is particularly pointed out and distinctly claimed as follows:

1. Substituted pentachlorocyclopentadienes of the formula $C_5Cl_5$—R wherein R is selected from the group consisting of allyl, 3-lower-alkyl-substituted-allyl, 2-cyclopentenyl, 2-cyclohexenyl and cinnamyl, produced by the alkylation of the pentachlorocyclopentadieneyl anion with an alkyl halide of the fomula RX wherein X is a halogen and R has the value given above.

2. Allylpentachlorocyclopentadiene of claim 1.

3. Polymerized allylpentachlorocyclopentadiene of claim 2.

4. 3-pentachlorocyclopentadienylcyclohexene of claim 1.

5. Cinnamylpentachlorocyclopentadiene of claim 1.

6. A process for preparing substituted pentachlorocyclopentadiene compounds of the formula $C_5Cl_5$—R wherein R is a member selected from the group consisting of lower-alkyl, benzyl, substituted benzyl, allyl and substituted allyl which comprises contacting at below 0° C. hexachlorocyclopentadiene with lithium aluminum hydride in the presence of an unreactive organic solvent, and contacting at below 0° C. the so-produced pentachlorocyclopentadienyl anion with a compound of the formula RX wherein R is defined as above and X is halogen.

References Cited by the Examiner

UNITED STATES PATENTS 2,597,016   5/1952   McBee _____ 260—91.5

FOREIGN PATENTS 646,985   12/1950   Great Britain.

OTHER REFERENCES

McBee et al.: J.A.C.S. 77, pages 389–91; Chem. Abstracts, vol. 49 (1955), Reaction of Hexachlorocyclopentadienes With Olefins.

SAMUEL H. BLECH, *Primary Examiner.*

WILLIAM H. SHORT, *Examiner.*

H. N. BURSTEIN, M. GOLDSTEIN, J. C. MARTIN,
*Assistant Examiners.*